(12) United States Patent
McCutchen

(10) Patent No.: US 10,335,715 B2
(45) Date of Patent: Jul. 2, 2019

(54) WATER SKIMMING DEVICE AND METHOD

(71) Applicant: SW FEESAVER, LLC, Greenville, SC (US)

(72) Inventor: James McCutchen, Greenville, SC (US)

(73) Assignee: SW Feesaver, LLC, Greenville, SC (US)

( * ) Notice: Subject to any disclaimer, the term of this patent is extended or adjusted under 35 U.S.C. 154(b) by 462 days.

(21) Appl. No.: 14/888,502

(22) PCT Filed: May 16, 2014

(86) PCT No.: PCT/US2014/038453
§ 371 (c)(1),
(2) Date: Nov. 2, 2015

(87) PCT Pub. No.: WO2014/186743
PCT Pub. Date: Nov. 20, 2014

(65) Prior Publication Data
US 2016/0051907 A1    Feb. 25, 2016

Related U.S. Application Data

(60) Provisional application No. 61/824,578, filed on May 17, 2013.

(51) Int. Cl.
*B01D 21/34* (2006.01)
*B01D 21/30* (2006.01)
(Continued)

(52) U.S. Cl.
CPC ....... *B01D 21/307* (2013.01); *B01D 21/0003* (2013.01); *B01D 21/2444* (2013.01); *B01D 21/34* (2013.01)

(58) Field of Classification Search
CPC .................................................... B01D 21/307
See application file for complete search history.

(56) References Cited

U.S. PATENT DOCUMENTS 5,290,434 A * 3/1994 Richard ............. B01D 21/2444
137/398
5,549,817 A 8/1996 Horsley et al.
(Continued)

FOREIGN PATENT DOCUMENTS

| KR | 10-20040042229 | 5/2004 |
|---|---|---|
| KR | 10-20090034526 | 4/2009 |
| KR | 10-20100082431 | 7/2010 |

OTHER PUBLICATIONS

Search Report for International Application No. PCT/US2014/038453, dated Sep. 26, 2014.

*Primary Examiner* — Peter Keyworth
(74) *Attorney, Agent, or Firm* — JK Intellectual Property Law, PA

(57) ABSTRACT

A water skimmer has a float portion supporting a drain portion for draining water from a sediment basin. The drain portion includes a first pipe connect via flexible couplings to a second pipe and then to a water removal system. Water enters the first pipe's orifice through a removable, restrictive orifice saddle. The first pipe is bolted to the float portion using a guard and brackets that hold first pipe just below the water surface to receive water with less sediment. The guard also blocks floating debris while allowing water to flow to the weir under its bottom edge. As the water level rises and falls, the flexible couplings and float portion help maintain first pipe horizontal.

13 Claims, 3 Drawing Sheets

(51) Int. Cl.
*B01D 21/24* (2006.01)
*B01D 21/00* (2006.01)

(56) References Cited

U.S. PATENT DOCUMENTS

| | | | | |
|---|---|---|---|---|
| 5,618,410 A | * | 4/1997 | Wallace | A47L 7/0028 |
| | | | | 137/398 |
| 5,820,751 A | | 10/1998 | Faircloth, Jr. | |
| 9,574,337 B1 | * | 2/2017 | Lang | E03F 5/107 |
| 2007/0251879 A1 | * | 11/2007 | Batten | B01D 17/0214 |
| | | | | 210/532.1 |

* cited by examiner

WATER SKIMMING DEVICE AND METHOD

PRIORITY CLAIM

This application claims benefit to U.S. Provisional Application Ser. No. 61/824,578 filed May 17, 2013, and claims priority to PCT International Application No. PCT/US2014/038453 filed May 16, 2014.

BACKGROUND OF THE INVENTION

The present invention relates generally to water skimmers used to control the removal of water from sediment basins.

Water flow rate control skimmers are used in storm water and erosion control applications to control the release of water from ponds and sediment basins. They release water to an adjacent area at controlled rates from just below a sediment basin's water surface where the water has the least sediment, leaving the settled sediment to accumulate in the bottom of the basin.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention; its sole purpose is to present concepts of the invention in a simplified form as a prelude to the more detailed description that is subsequently presented.

The present invention is a skimmer for releasing water from a sediment basin to a water removal system and a method for installing the skimmer. The skimmer includes a float portion operatively connected to a drain portion. The apparatus may include one or more floats for maintaining the drain portion near the surface of the water in the sediment basin. The float portion must have the right balance of water displacement (its flotation aspect) and weight to maintain the drain portion at the proper depth. For simplicity, the float portion will be referred to herein as the float portion notwithstanding its position relative to the surface of the water. The drain portion includes a first pipe connected to the float portion and a second pipe that drains into the water removal system. The second pipe is connected using a flexible coupling at each end, coupling to the first pipe and one to the stub out of the water removal system so that the first pipe can rise and fall with the water level and the second pipe remains connected to it and the water removal system despite changes in its orientation as it follows the vertical movements of the first pipe. The first pipe is attached to the float member so as to be held horizontally just below the surface of the water. The first pipe has an orifice to receive the basin water and a guard around the orifice to exclude debris. The orifice size can be modified with an orifice saddle and clamps.

To facilitate a constant or near constant flow rate of relatively sediment-free water, the drain head is supported by the float at a level just below the water surface and limits the instantaneous volume of water that enters the drain to obtain the desired flow rate.

The orientation of the float portion with respect to the first pipe, and the flexible couplings of the second pipe help maintain water flow rate control because both cooperate to hold first pipe in a horizontal orientation just below the water surface so a constant volume of water is able to flow into orifice.

The present invention also includes a method for installing a skimmer in a sediment basin. The method may including the following steps: 1) providing a skimmer having a float portion and a drain portion; 2) preparing the sediment basin below the skimmer; 3) providing a stub out for the collected water to drain into the water removal system; and 4) connecting the skimmer to the stub out. Float portion includes at least one float that will support the drain portion at the required depth below the surface. The drain portion includes: a first pipe with an orifice, a second pipe, two flexible couplings, a stub out to allow connection of the second pipe to the water removal system, a guard to exclude debris from flowing into the drain portion, an orifice saddle to modify the size of the orifice on the first pipe, two clamps to hold the orifice saddle to the first pipe, and several brackets and bolts to connect the first pipe to the guard and the guard to the float portion.

Other features and their advantages will be readily apparent to those skilled in the arts, techniques and equipment relevant to the present invention from a careful reading of the Detailed Description of Preferred Embodiments, accompanied by the following drawings.

DETAILED DESCRIPTION OF PREFERRED EMBODIMENT

The present invention includes methods and apparatuses relating to water skimmers for use in removing water from a sediment basin, wastewater lagoon or pond. Sediment basins, which term will be used to refer to ponds and any small body of water, man-made or otherwise, engineered or natural, that receives runoff from its immediate surroundings, are used to prevent sediment produced by heavy rainfall from adversely affecting the vicinity. These may also include wastewater lagoons. Sediment basins are used in connection with a water removal system which is any structure or land configuration that receives water from the sediment basin and redistributes it to that water removal system, preferably leaving sediment behind.

Figure 1:
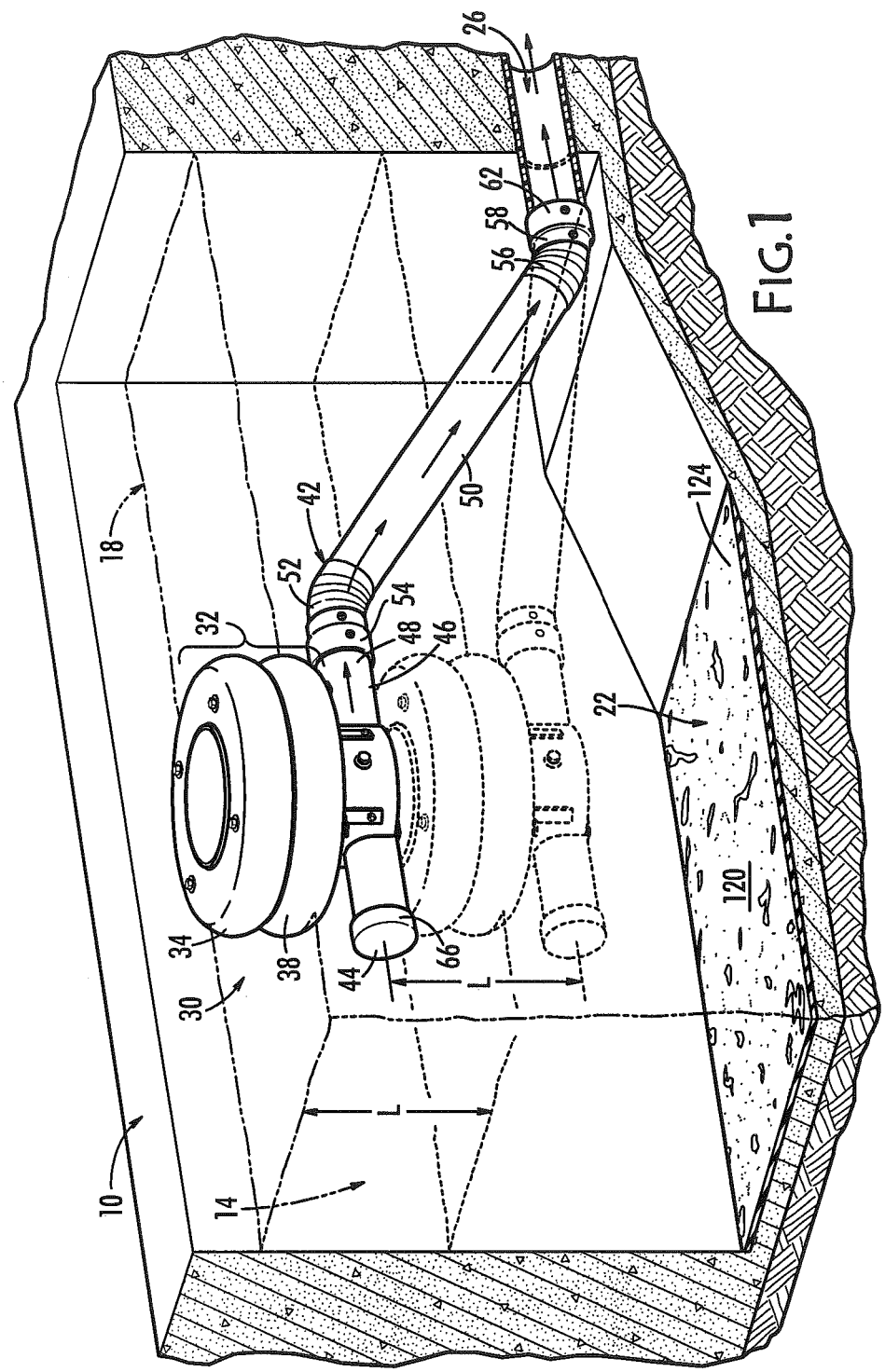
FIG. 1 is a perspective view of a water skimmer in a sediment basin, according to an embodiment of the present invention.

Referring now to the FIG. 1, there is shown a portion of sediment basin 10 containing water 14. The water has a surface 18 a distance from the bottom 22 of basin 10. Sediment in that water will tend to settle out, that is, to slowly fall to bottom 22, leaving water 14 near surface 18 relatively cleaner than that at bottom 22. Accordingly, water 14 that is transferred to a water removal system through an outlet 26 will be relatively clearer if taken from just below surface 18 than closer to bottom 22.

A skimmer, generally indicated by reference number 30 includes a float portion 32 which, as shown in FIG. 1, includes an upper float 34 and lower float 38. The choice of one, two, or more floats is a question of the weight to be supported by float portion 32 needed to counteract the buoyancy of the second pipe 50, which may require a modest amount of experimentation and calculation within the level of ordinary skill of a professional engineer. Float portion 32 may be made of polyethylene or high density polyethylene. FIG. 1 also shows skimmer 30 floating both on a nominal water surface 18 and, on a lower water surface 18 in phantom lines to illustrate where skimmer 30 would be if the amount of water 14 were reduced so that water surface decreased by a distance L. Skimmer 30 would also be lower by the same distance L.

Upper and lower floats 34, 38, support a drain portion 42 that includes a first pipe 46 and a second pipe 50. First pipe 46 has a first end 44 and a second, opposing end 48. Second pipe has a first end 52 and an opposing second end 56. Second end 48 of first pipe 46 is attached to first end 52 of second pipe 50 using an upper flexible coupling 54. Second end 56 of second pipe 50 is attached to a lower flexible coupling 58 where it may be attached to a stub out 62 on the end of outlet 26 to a water removal system (not shown). First end 44 of first pipe 46 may be terminated in a cap 66 which may be integral or a separate part that is attached to first end 44.

First pipe 46 is attached to float portion 32 so that first pipe 46 remains generally parallel to surface 18 and orifice 70 is on the top of first pipe 46. Water taken from just below surface 18 flows under bottom edge of guard 108 and into orifice 70, into first pipe 46 and then through second pipe 50 and ultimately through the outlet 26 to water removal system regardless of the elevation of surface 18 of water in sediment basin 10.

Float portion 32, first pipe 46 and second pipe 50 may be made of high density polyethylene (HDPE), which is durable, tough and highly UV resistant, or, for temporary applications, of polyvinylchloride. Second pipe 50, because it will pivot from approximately horizontal when first installed to a more vertical orientation needs to be longer than water 14 is deep, such as 50% longer than the depth of water 14 in sediment basin 10.

Figure 2:
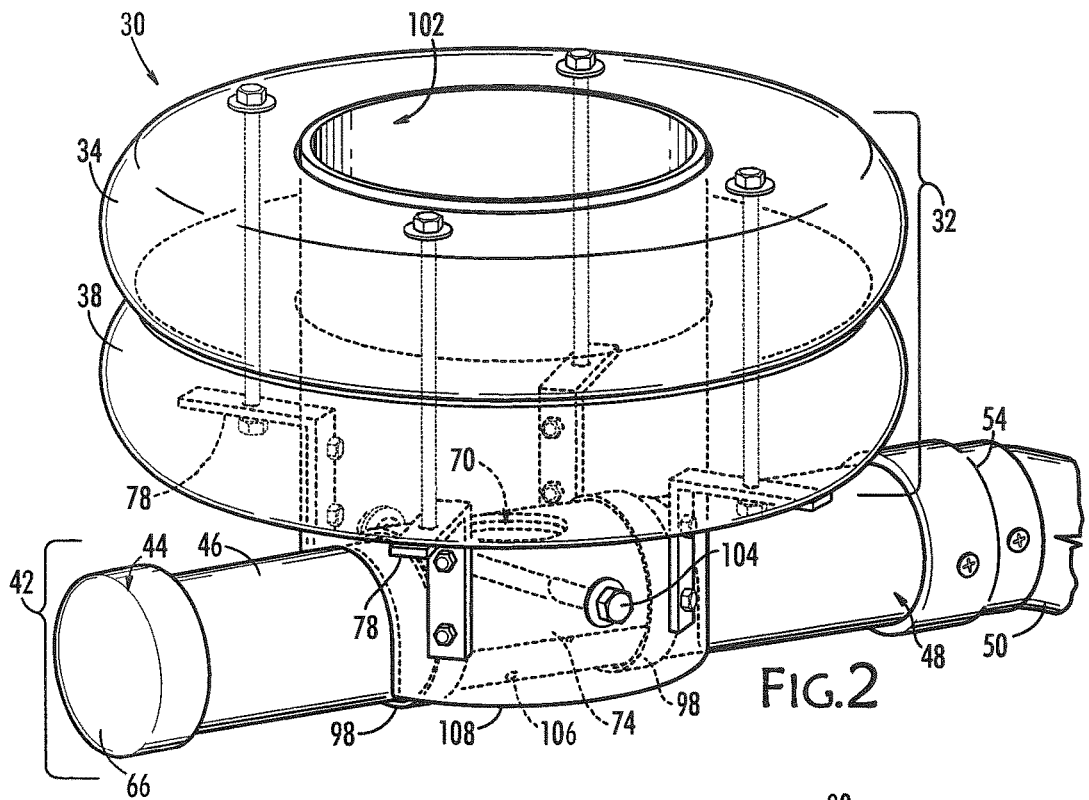
FIG. 2 is a perspective view of a water skimmer with two floats showing portions of the structure of the skimmer using phantom lines, according to an embodiment of the present invention.
Figure 3:
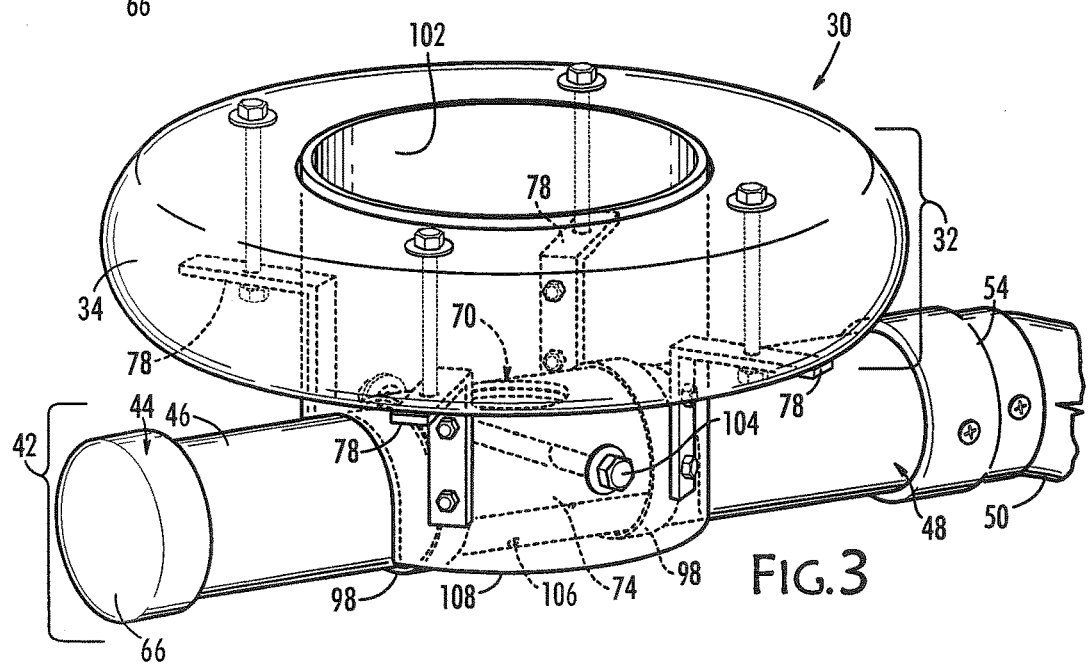
FIG. 3 is a perspective view of a water skimmer with one float showing portions of the structure of the skimmer using phantom lines, according to an embodiment of the present invention.
Figure 4:
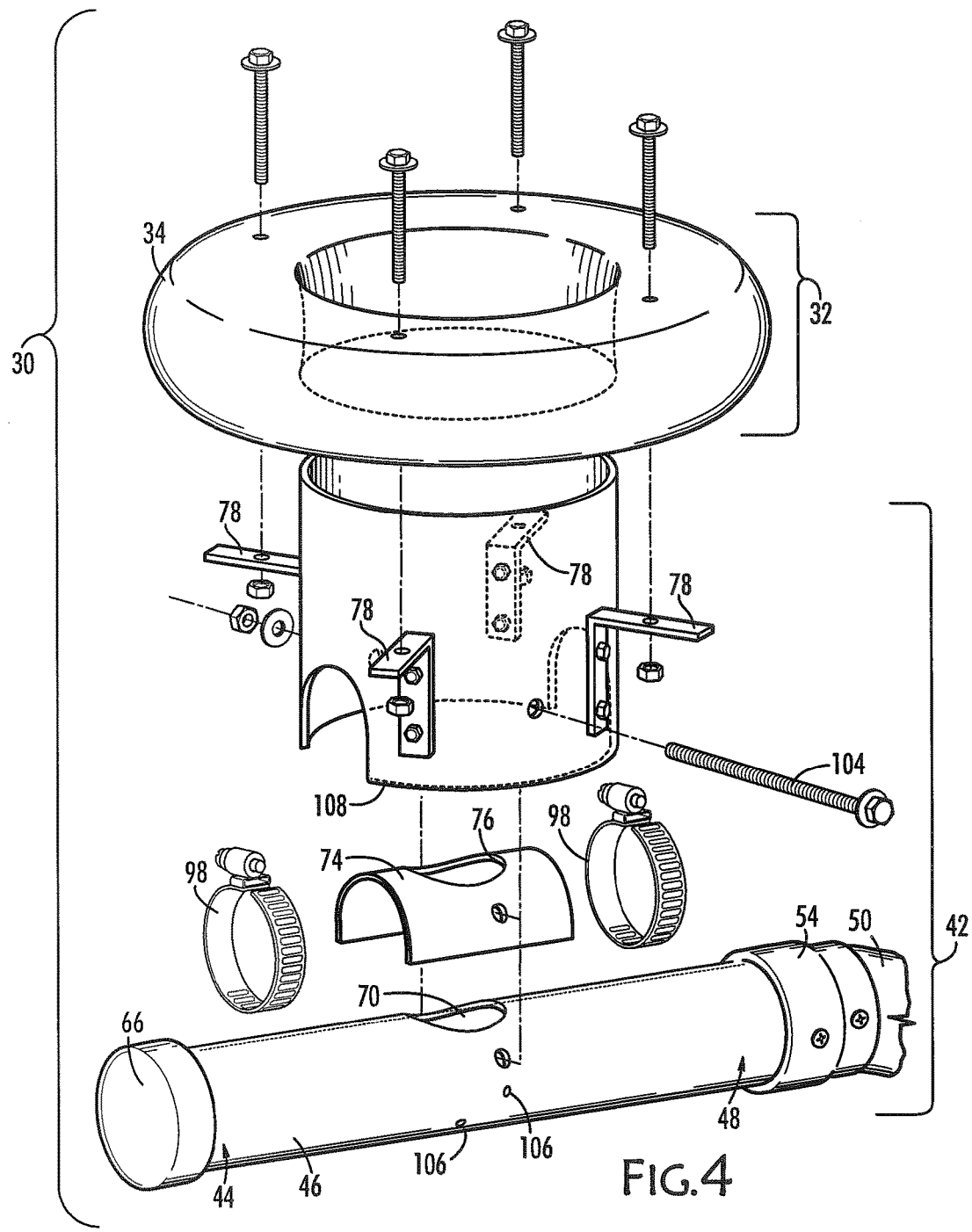
FIG. 4 is an exploded, perspective view of a water skimmer with one float, according to an embodiment of the present invention.

Referring now to FIGS. 2-4, first pipe 46 has an orifice 70 (best seen in FIG. 4) formed therein and held by float portion 32 so that orifice 70 is just below water surface 18 of sediment basin 10 so that it will admit water 14 from just below the surface 18. Water 14 taken just below surface 18 has relatively less sediment than water near bottom 22 and, by being below surface 18, orifice may receive as much water as its size will allow, subject to the head of water 14 which is controlled by height of float 32 relative to orifice 70.

An orifice saddle 74 is attached to first pipe 46. Orifice saddle 74 has a hole 76 formed in it that can be placed in registration with orifice 70. Orifice saddle 74 may be selected to restrict flow into first pipe 46 and may exclude debris. Clamps 98 are used to hold orifice saddle 74 to first pipe 46 and to permit removal and replacement of orifice saddle 74 to alter the amount of water entering first pipe 46.

Skimmer 30 includes a guard 102 that defines the entrance to drain portion 42. Guard 102, secured to first pipe 46 by a bolt 104 (but could alternatively be fused to drain portion and not require bolt), receives the inflow of water 14 in the vicinity of skimmer 30 from below its bottom edge 108 when it flows into orifice 70. Guard 102 thereby prevents most floating debris from entering orifice 70. Guard 102 also holds float portion 32 by providing a surface for attaching brackets 78 to position upper float 34 and lower float 38 with respect to first pipe 46. First pipe 46 is to be positioned below water surface 18, and may be several centimeters below water surface 18, such as 10 cm (4 inches).

Brackets 78 may conveniently be L-shaped to permit being bolted to guard 102 and float portion 32 using bolts 100 that extend through float portion 32 regardless of whether there is only upper float 43 or also a lower float 38. Brackets 78 hold float portion 32 a fixed distance from first pipe 46, they can also assure first pipe 46 is below surface 18 as float portion 32 will rest sets into water to some extent, partially below the surface of water and partly above.

Guard 102, its bolt 104, orifice saddle 74 and its clamps 98, may also assure that drain portion 42 is positioned between first end 44 and second end 48 of first pipe 46 so that first pipe 46 is approximately level, a little more or a little less, which helps to keep orifice 70 generally level with respect to the water surface 18. Guard 102 may be made of polyethylene or high density polyethylene, bolt 86 is made of stainless steel, and brackets are made of aluminum.

First pipe 46 includes at least one weep hole 106 formed therein to allow air inside it to escape and water 14 to enter slowly. This allows water 14 to further drain when water surface 18 is below elevation of orifice 70

The present invention is also a method for installing skimmer 30.

To install skimmer 30 according to the present invention, a user first provides a sediment basin 10 near a water removal system and forms a depression 120 in a portion of the bottom of sediment basin (see FIG. 1). Depression 120 is preferably approximately 30 cm (12 inches) below the balance of bottom 22 of sediment basin 10 Next riprap 124 is placed in the depression so that, when skimmer 30 is placed on riprap 124, first pipe 46 is about 20 cm (8 inches) below bottom 22. The next step is to attach skimmer 30 to water removal system 26 by first attaching lower flexible coupling 58 to water removal system through a stub out 62. Now lower flexible coupling 58 is connected to opposing end 56 of second pipe 50. First end 52 of second pipe 50 is connected to upper flexible coupling 54. Now, upper flexible coupling 54 is connected to second end 48 of first pipe 46. First pipe 46 is connected to float portion 32 so that when float portion 42 is floating on water surface 18, orifice 70 of first pipe 46 is below water surface 18.

As sediment basin 10 fills with water 14, float portion 32 and first pipe 46 will rise with water 14 riding on water surface 18, and second pipe 50 will pivot with respect to first pipe 46 following its movement.

Preferably, float portion 32 is connected to first pipe 46 so that float portion 32 keeps first pipe 46 more or less level. Also, first pipe 46 may be held by float portion 32 just below water surface 18, by about 10 cm (4 inches), for example.

Those skilled in the relevant arts will appreciate from the foregoing description of preferred embodiments that substitutions and modification can be made without departing from the spirit and scope of the invention which is defined by the appended claims.

What is claimed is:

1. A skimmer for removing water from a sediment basin to a water removal system, said sediment basin having a depth, said skimmer comprising:
   a float portion;
   a first pipe having a longitudinal axis, said first pipe being attached to and held by said float portion with said longitudinal axis in a horizontal position and at a distance below the surface of water in a sediment basin, said pipe having an orifice formed therein to admit said water from below said surface, said first pipe having a first end and an opposing second end;

a guard attached to said float portion and said first pipe, said guard fixedly positioning said float portion with respect to said first pipe and said orifice so that said orifice of said first pipe is located below said surface of said water, said guard having a continuous, vertically-extending side wall having a bottom edge defining a water flow path opening located below said orifice, said guard and said float portion surrounding said orifice upwardly from said bottom edge to thereby define a flow path into said orifice from the sediment basin to be only through said flow path opening, upwardly to said orifice, then downwardly though said orifice into said first pipe;

a second pipe having a first end and a second end;

an upper flexible coupling on said first end of said second pipe, said flexible coupling connected to said second end of said first pipe; and a lower flexible coupling on said second end of said second pipe, said second flexible coupling being attachable to a water removal system; wherein said first pipe is attached to said float portion so that said orifice of said first pipe remains below said surface and the longitudinal axis remains below said surface by said distance, and said water flows through said orifice into said first pipe and then through said second pipe to said water removal system regardless of the elevation of said surface of water in said sediment basin.

2. The skimmer of claim 1, wherein said float portion is made of high density polyethylene or polyethylene.

3. The skimmer of claim 1, wherein said first pipe and said second pipe are made of high density polyethylene or polyethylene.

4. The skimmer of claim 1, further comprising:
an orifice saddle carried on said first pipe, said orifice saddle having a hole formed therein in registration with said orifice; and
said orifice saddle being over said orifice in said first pipe so that said water flows through said hole in said orifice saddle, through said orifice, and into said first pipe.

5. The skimmer of claim 2, further comprising clamps to hold said orifice saddle to said first pipe.

6. The skimmer of claim 5, wherein said clamps and said orifice saddle are removable.

7. The skimmer of claim 1, further comprising a bolt attaching said guard to said first pipe.

8. The skimmer of claim 7, wherein said guard is made of high density polyethylene.

9. The skimmer of claim 7, wherein said bolt is made of stainless steel.

10. The skimmer of claim 7, wherein said guard is attached to said float portion by brackets.

11. The skimmer of claim 10, wherein said brackets hold said float portion near the top of said first pipe.

12. The skimmer of claim 1, wherein said first pipe includes at least one weep hole formed therein.

13. The skimmer of claim 1, wherein said float portion comprises an upper float and a lower float.

* * * * *